(12) United States Patent
Ramle et al.

(10) Patent No.: US 12,181,444 B2
(45) Date of Patent: Dec. 31, 2024

(54) METHOD FOR DETECTING POSITION ANOMALY OF TEST OBJECT, CONTROL SYSTEM, TESTING SYSTEM, ROBOT SYSTEM, TESTING ROBOT, AND PROGRAMMING DEVICE

(71) Applicant: ABB Schweiz AG, Baden (CH)

(72) Inventors: August Ramle, Gothenburg (SE); Göran Bergström, Torslanda (SE); Johanna Hesslind, Gothenburg (SE)

(73) Assignee: ABB Schweiz AG, Baden (CH)

( * ) Notice: Subject to any disclaimer, the term of this patent is extended or adjusted under 35 U.S.C. 154(b) by 488 days.

(21) Appl. No.: 17/594,616

(22) PCT Filed: Apr. 17, 2020

(86) PCT No.: PCT/EP2020/060876
§ 371 (c)(1),
(2) Date: Oct. 25, 2021

(87) PCT Pub. No.: WO2020/229092
PCT Pub. Date: Nov. 19, 2020

(65) Prior Publication Data
US 2022/0196611 A1    Jun. 23, 2022

(30) Foreign Application Priority Data

May 13, 2019    (WO) .................. PCT/EP2019/062142

(51) Int. Cl.
*G01N 29/265*    (2006.01)
*B25J 9/16*    (2006.01)
(Continued)

(52) U.S. Cl.
CPC .......... *G01N 29/265* (2013.01); *B25J 9/1679* (2013.01); *B25J 15/0019* (2013.01);
(Continued)

(58) Field of Classification Search
CPC .. G01N 29/04; G01N 2291/265; G01N 29/28; G01N 29/0654; G01N 29/4472;
(Continued)

(56) References Cited

U.S. PATENT DOCUMENTS 4,475,160 A * 10/1984 Inaba .................. G05B 19/4062
700/87
6,122,060 A    9/2000 Drake, Jr.
(Continued)

FOREIGN PATENT DOCUMENTS

CN    102507748 A    6/2012
CN    113785195 A    12/2021
(Continued)

OTHER PUBLICATIONS

International Preliminary Report on Patentability; Application No. PCT/EP2020/060876; Issued: Nov. 16, 2021; 10 Pages.
(Continued)

*Primary Examiner* — Jacques M Saint Surin
(74) *Attorney, Agent, or Firm* — Whitmyer IP Group LLC

(57) ABSTRACT

A method for detecting a position anomaly of a test object on a workpiece, the method including capturing an image of the test object to obtain image data; determining a real position of the test object in relation to the testing robot based on the image data; moving a testing sensor carried by the testing robot into contact with the test object based on the real position; acquiring test data of the test object by means of the testing sensor when the testing sensor is in contact with the test object; and detecting a position anomaly of the test object based on a comparison between a test object position and a reference position, the test object position being based on the real position, based on the test data and/or based on a position of the testing robot when the testing sensor is in contact with the test object.

13 Claims, 4 Drawing Sheets

(51) Int. Cl.
- *B25J 15/00* (2006.01)
- *G01N 29/04* (2006.01)
- *G01N 29/06* (2006.01)
- *G01N 29/22* (2006.01)
- *G01N 29/28* (2006.01)
- *G01N 29/44* (2006.01)

(52) U.S. Cl.
CPC ........... *G01N 29/04* (2013.01); *G01N 29/043* (2013.01); *G01N 29/0654* (2013.01); *G01N 29/225* (2013.01); *G01N 29/28* (2013.01); *G01N 29/4472* (2013.01); *G01N 2291/267* (2013.01)

(58) Field of Classification Search
CPC ............... G01N 29/225; G01N 29/043; G01N 2291/267; B25J 15/0019
USPC .......................................................... 73/619
See application file for complete search history.

(56) References Cited

U.S. PATENT DOCUMENTS

| | | | |
|---|---|---|---|
| 6,266,138 B1* | 7/2001 | Keshavmurthy | G01N 21/88 356/600 |
| 7,516,022 B2* | 4/2009 | Lee | G01N 3/00 702/33 |
| 8,087,298 B1 | 1/2012 | Dimambro et al. | |
| 9,579,788 B2* | 2/2017 | Rosenberg | B25J 9/16 |
| 9,594,059 B1 | 3/2017 | Brady et al. | |
| 10,036,731 B2* | 7/2018 | Edwards, II | G01N 29/262 |
| 11,852,611 B2* | 12/2023 | Ushijima | G01N 29/07 |
| 11,980,975 B2* | 5/2024 | Saito | B23K 9/0953 |
| 2003/0234239 A1 | 12/2003 | Lee et al. | |
| 2007/0144262 A1 | 6/2007 | Aznar et al. | |
| 2008/0210009 A1 | 9/2008 | Tanishiki | |
| 2015/0253288 A1 | 9/2015 | Spencer et al. | |
| 2016/0264262 A1 | 9/2016 | Colin et al. | |
| 2017/0284970 A1 | 10/2017 | Edwards, II et al. | |
| 2022/0268740 A1* | 8/2022 | Allring | B25J 9/1679 |

FOREIGN PATENT DOCUMENTS

| | | |
|---|---|---|
| DE | 102005043776 A1 | 3/2007 |
| DE | 102017125033 A1 | 4/2019 |
| EP | 3354918 A1 | 8/2018 |
| JP | H11207461 A | 8/1999 |
| WO | 2017133756 A1 | 8/2017 |

OTHER PUBLICATIONS

1 European Office Action; Application No. EP19725939.3; Completed: Jan. 29, 2024; 6 Pages.
International Search Report and Written Opinion of the International Searching Authority; Application No. PCT/EP2019/062142; Completed: Jan. 23, 2020; Mailing Date: Jan. 31, 2020; 10 Pages.
International Search Report and Written Opinion of the International Searching Authority; Application No. PCT/EP2020/060876; Completed: May 29, 2020; Mailing Date: Jul. 31, 2020; 15 Pages.
Chinese First Office Action and Search Report; Application No. 202080032382X; Completed Jul. 24, 2024; 16 Pages.
Second Chinese Office Action; Application No. 2019800960967; Completed: Oct. 17, 2024; Issued: Oct. 19, 2024; 19 Pages.

* cited by examiner

METHOD FOR DETECTING POSITION ANOMALY OF TEST OBJECT, CONTROL SYSTEM, TESTING SYSTEM, ROBOT SYSTEM, TESTING ROBOT, AND PROGRAMMING DEVICE

TECHNICAL FIELD

The present disclosure generally relates to detection of a position anomaly of a test object, such as a spot weld on a car body. In particular, a method for detecting a position anomaly of a test object on a workpiece, a control system for detecting a position anomaly of a test object on a workpiece, a testing system comprising a control system, a robot system comprising a testing system, a testing robot comprising a calibration arrangement and a programming device for programming operations of a testing robot, are provided.

BACKGROUND

It is conventionally known to manually inspect weld quality. Manual ultrasound probing is the dominant method for inspecting or testing the quality of welds within the automotive industry. Manual ultrasound inspections are expensive and time consuming. A car body may for example comprise 5000 welds. A manual cycle time for inspecting one spot weld may be 1-2 minutes. Due to the slow nature of manual work, the labor cost to find one defect weld with a manual setup can be as high as 100 kEUR. Manual ultrasound inspections are also ergonomically bad.

One solution to mitigate the effects of possible weld joint failures is to introduce a safety margin so that a higher number of spot welds are created in the joining area, i.e. a number that is higher than the number of spot welds corresponding to the calculated load-carrying capacity. Some car manufacturers use a 15-25% over specification of welds to absorb potential errors.

Unpublished international patent application PCT/EP2019/062142, filed on 13 May 2019 and incorporated herein by reference, discloses a method for non-destructive inspection of at least one test object on a workpiece. The method comprises obtaining a theoretical position of each test object in relation to a testing robot; capturing an image of each test object to obtain image data; determining a real position of each test object in relation to the testing robot on the basis of the image data; and bringing a sensor carried by the testing robot in contact with each test object to obtain a respective test measurement. PCT/EP2019/062142 further discloses a corresponding test system for carrying out a non-destructive inspection of at least one test object on a workpiece.

SUMMARY

One object of the present disclosure is to provide a method for effectively detecting a wide range of faults in a production line.

A further object of the present disclosure is to provide a method for detecting a position anomaly of a test object on a workpiece.

A still further object of the present disclosure is to provide an improved method for detecting a position anomaly of a test object on a workpiece.

A still further object of the present disclosure is to provide a method for detecting a position anomaly of a test object on a workpiece, which method solves several or all of the foregoing objects in combination.

A still further object of the present disclosure is to provide a control system for detecting a position anomaly of a test object on a workpiece, which control system solves one, several or all of the foregoing objects.

A still further object of the present disclosure is to provide a testing system solving one, several or all of the foregoing objects.

A still further object of the present disclosure is to provide a robot system solving one, several or all of the foregoing objects.

A still further object of the present disclosure is to provide a testing robot comprising an image sensor and a testing sensor, which testing robot enables fast, simple and cheap calibration of the image sensor and/or the testing sensor.

A still further object of the present disclosure is to provide a programming device for programming operations of a testing robot having an image sensor and a testing sensor, which programming device enables fast, simple and accurate programming of the testing robot.

According to one aspect, there is provided a method for detecting a position anomaly of a test object on a workpiece, the method comprising capturing an image of the test object to obtain image data; determining a real position of the test object in relation to the testing robot based on the image data; moving a testing sensor carried by the testing robot into contact with the test object based on the real position; acquiring test data of the test object by means of the testing sensor when the testing sensor is in contact with the test object; and detecting a position anomaly of the test object based on a comparison between a test object position and a reference position, the test object position being based on the real position, based on the test data and/or based on a position of the testing robot when the testing sensor is in contact with the test object.

Although the method in PCT/EP2019/062142 works great to automatically bring a testing sensor in a correct position and orientation in relation to the test object and to thereby perform an accurate test measurement, the inventors have realized that this method can be utilized in various ways to also detect a position anomaly of the test object. Thus, even if the test object as such is determined to be of high quality, the position of the test object may not be as intended.

The method according to this aspect makes use of the real position, the test data and/or a position of the testing robot when the testing sensor is in contact with the test object, to detect a position anomaly of the test object. Since the real position, the test data and the position of the testing robot may already be known when performing the non-destructive testing, utilization of one or more of these values to also detect a position anomaly of the test object can be made automatically without any additional effort. The method therefore provides a very simple, cheap and effective detection of position anomalies of test objects. By comparing the test object position with a reference position each time a non-destructive testing is performed, the method provides a far higher chance to detect positional flaws of test object than a human could manually do. The position anomaly may not even be detectable by a human.

Furthermore, in case it is concluded that there is a position anomaly of the test object, the test object as such does not have to be defect. Rather, the position anomaly may be the result of a defect outside the test object, for example a broken fixture. The detection of a position anomaly of the test object can thus be derived to a wide range of error sources in a production line. The method therefore enables detection of errors in a production line that were not previously possible to detect. Although the reason behind a position anomaly may need to be traced manually, the position anomaly can be detected immediately. Due to the repeatability of the testing robot, one can determine how the positions of corresponding test objects change from one batch to another by just adding test object positions.

In case the test object position is based on the real position, the real position may simply constitute the test object position. By moving the testing sensor into contact with the test object based on the real position, the testing sensor can be positioned correctly in relation to the test object for obtaining a valid test measurement. The real position may be determined in two or three dimensions.

Alternatively, the method may comprise detecting a position anomaly of the test object based on a comparison between the reference position and a test object position of the test object determined based on the test data. A test object position of the test object as determined based on the test data may for example be a geometrical center position of the test object. A geometrical center position of the test object may be different from the real position as determined based on the image data. A test object position determined based on the test data may be determined in two or three dimensions.

Alternatively, the method may comprise detecting a position anomaly of the test object based on a comparison between the reference position and the position of the testing robot when the testing sensor is in contact with the test object. A test object position based on the position of the testing robot when the testing sensor is in contact with the test object may be determined in one, two or three dimensions.

Alternatively, the method may comprise detecting a position anomaly of the test object based on a comparison between the reference position and a test object position determined based on any combination of the real position, the test data and/or the position of the testing robot when the testing sensor is in contact with the test object.

In any case, the test object position may be determined in relation to the testing robot or in relation to the workpiece. However, the test object position does not necessarily be determined as an absolute position. In case the test object position is determined in relation to the testing robot, the test object position may for example be determined in a coordinate system of the testing robot.

One or more test object positions may be plotted in a scatterplot. By analyzing the scatterplot, either automatically or manually, various trends and outliers can be detected in order to conclude whether there is a position anomaly.

The method may further comprise storing the test object position. The stored test object position may then be used as a reference position. The method may further comprise repeating the above steps for a plurality of corresponding test objects on different workpieces. Also, the further test object positions may be stored and used as one or more reference positions.

The method may further comprise obtaining a theoretical position of the test object. In this case, the method may further comprise positioning an image sensor relative to the workpiece based on the theoretical position prior to capturing the image.

The testing sensor may be a non-destructive testing sensor. The testing sensor may comprise coupling medium, such as water or ultrasonic gel. In this case, the moving of the testing sensor into contact with the test object may comprise bringing the coupling medium into contact with the test object.

Each test object may be a spot weld. Further examples of test objects are arc welds or glue.

The reference position may be a mean test object position determined based on a plurality of test object positions for corresponding test objects on different workpieces. Alternatively, the reference position may be a nominal position. Alternatively, the theoretical position of the test object may be used as the reference position for comparison with the test object position to detect a position anomaly of the test object.

The method may further comprise determining that there is a position anomaly of the test object if a deviation of the test object position from the reference position exceeds a threshold value. A small deviation between test object positions may be expected from batch to batch. By utilizing the threshold value, an alarm may be issued if the deviation is larger than expected.

The method may further comprise determining that there is a position anomaly of the test object by means of machine learning. The machine learning may employ algorithms building a mathematical model using sample data. The sample data may for example comprise test object positions for corresponding test objects on different workpieces.

The testing robot may comprise a damper movable in response to a contact force between the testing sensor and the test object, and wherein the test object position is based on a position of the damper when the testing sensor exerts a pre-defined force on the test object. The test object position based on a position of the damper when the testing sensor exerts a pre-defined contact force on the test object is one example of a position of the testing robot when the testing sensor is in contact with the test object. Such test object position may be determined in one dimension.

When the testing sensor exerts the pre-defined force on the test object as determined by the damper, the test object position may be determined either based on the position of the damper or the based on the position of the testing robot, e.g. a tool center point thereof. The position of the damper does not have to be an absolute value.

The method may further comprise bringing the testing sensor into contact with the test object to exert a pre-defined force on the test object as determined by means of the damper. The damper may be provided between the testing sensor and an arm of the testing robot. The damper may be configured to detect a contact between the testing sensor and the workpiece, and be used to cause the testing sensor to exert the same constant force on each test object.

The test object position may be based on a position of a tool center point of the testing robot when the testing sensor is in contact with the test object. The position of the tool center point of the testing robot when the testing sensor is in contact with the test object is one example of a position of the testing robot when the testing sensor is in contact with the test object.

The image data may be captured by means of an image sensor carried by the testing robot. Regardless of whether the image sensor is carried by the testing robot or not, the image sensor may be a camera.

According to a further aspect, there is provided a control system for detecting a position anomaly of a test object on a workpiece, the control system comprising at least one data processing device and at least one memory having a computer program stored thereon, the computer program comprising program code which, when executed by one or more of the at least one data processing device, causes one or more of the at least one data processing device to perform the steps of commanding an image sensor provided on a testing robot to capture an image of a test object on a workpiece to obtain image data; commanding the testing robot to move a testing sensor provided on the testing robot into contact with the test object; commanding the testing sensor to acquire test data of the test object when in contact with the test object; detecting a position anomaly of the test object based on a comparison between a test object position and a reference position, the test object position being based on the real position, based on the test data and/or based on a position of the testing robot when the testing sensor is in contact with the test object. The computer program may further comprise program code which, when executed by one or more of the at least one data processing device, causes one or more of the at least one data processing device to perform any step, or command performance of any step, according to the present disclosure.

According to a further aspect, there is provided a testing system comprising a testing robot, an image sensor, a testing sensor carried by the testing robot and a control system according to the present disclosure. The testing sensor may comprise at least one ultrasonic transducer. The testing sensor may comprise an array of ultrasonic transducers.

The testing robot may comprise a damper movable in response to a contact force between the testing sensor and the test object. In this case, the computer program may comprise program code which, when executed by one or more of the at least one data processing device, causes one or more of the at least one data processing device determine the test object position based on a position of the damper when the testing sensor exerts a pre-defined contact force on the test object.

The image sensor may be carried by the testing robot.

According to a further aspect, there is provided a robot system comprising a plurality of welding robots and a testing system according to the present disclosure.

According to a further aspect, there is provided a testing robot comprising a body; an arm movable relative to the body; an image sensor provided on the arm; a testing sensor provided on the arm; and a calibration arrangement comprising at least one reference object for a reference acquisition of image data by means of the image sensor and/or a reference acquisition of test data by means of the testing sensor, the calibration arrangement being fixed to the body.

By means of the calibration arrangement, a quality check of the testing sensor and/or of the image sensor can be easily performed by the testing robot. The quality check may be performed automatically and regularly. In this way, various malfunctions of the testing sensor and/or the image sensor can be detected at an early stage. The arrangement of the calibration arrangement on the body saves space and enables a setup of the testing robot to be performed prior to being delivered to a production site.

The at least one reference object may comprise a defect reference object not meeting a quality target for test data acquired by the testing sensor, and an approved reference object meeting the quality target. Thus, if the testing sensor functions correctly, the defect reference object should be classified as not meeting the quality target and the approved reference object should be classified as meeting the quality target.

The calibration arrangement may comprise a blocking structure at least partly surrounding one of the at least one reference object, the blocking structure being arranged for calibration of a membrane of the testing sensor. The reference object at least partly surrounded by the blocking structure may be an approved reference object meeting the quality target. The blocking structure may be configured such that the membrane can be brought into contact with the reference object if the membrane is convex enough, and such that if the membrane is not enough convex, the membrane cannot be brought sufficiently into contact with the reference object for a valid test measurement by means of the testing sensor. The blocking structure may be a ring surrounding the reference object. According to one example, the calibration arrangement comprises one defect reference object and two approved reference objects, where one of the approved reference objects is at least partly surrounded by the blocking structure.

The calibration arrangement may further comprise a reference feature with known position. The reference feature may be used to determine a position of the reference feature by means of image processing. If the position of the reference feature, as determined by the image processing, differs from the known position, it can for example be concluded that a position of the image sensor relative to the testing robot is incorrect.

The reference object of the calibration arrangement, either "good" or "bad", may further be used to calibrate a rotational position of the testing sensor by means of two reference measurements with a displacement of the testing sensor. Similarly, the reference feature of the calibration arrangement may further be used to calibrate a rotational position of the image sensor by means of two reference images with a displacement of the image sensor.

According to a further aspect, there is provided a programming device for programming operations of a testing robot having an image sensor and a testing sensor, the programming device comprising a display arranged to display image data of a test object on a workpiece as acquired by the image sensor; wherein the programming device is configured to receive a manual image input associated with the test object as displayed on the display, the manual image input being associated with non-destructive testing of the test object by means of the testing sensor; and create an instruction for an operation of the testing robot, the image sensor and/or the testing sensor in connection with non-destructive testing of the test object based on the manual image input.

Prior art testing robots are often manually jogged to each test object to be tested by the non-destructive testing device. Non-destructive testing sensors, such as ultrasonic testing sensors, may also be very sensitive to position and angle deviations. It is very cumbersome to manually teach a position and an angle for each test object by manual jogging of the test robot. Moreover, such process is error prone.

The programming device according to this aspect enables vision aided programming of the testing robot. This makes programming of the testing robot faster, easier and more accurate. The programming device enables a reduction of 50-70% of the programming time for non-destructive testing in comparison with manual jogging.

The manual image input may be a boundary adjacent to the test object on the display. By means of the boundary, movement restrictions of the testing robot can be defined. Alternatively, or in addition, the manual image input may be test object definition, such as a shape and/or position of the test object. Although the shape and position of the test object can be detected by image processing, the programming device enables fine tuning of the shape and/or position of the test object.

The programming device may be configured to receive a parameter input defining a parameter of the testing robot, the image sensor and/or the testing sensor, the parameter being associated with non-destructive testing of the test object on the display. Examples of parameter inputs are exposure time of the image sensor, grinding time of a grinder of the testing robot, an ultrasonic gain of the testing sensor (in case the testing sensor comprises an ultrasonic transducer) and a measurement angle of the testing sensor. Also, the manual image inputs may be parameter inputs.

The programming device may be configured to command test execution of an operation of the testing robot based on the parameter input. When test execution is commanded, the testing robot performs non-destructive testing on the test object currently displayed on the display. The programming device then displays image data from the testing on the display. The operator is thereby provided with feedback from actual test measurements. This has been found to be very valuable in order to effectively and accurately program the testing robot for non-destructive testing. If the operator is satisfied with the outcome, the operator may add the used parameters to the robot program. If the operator is not satisfied with the outcome, the user may adjust the parameters further. The programming device thereby enables both vision aided programming and vision aided testing of a program of the testing robot. In particular, the programming device may be configured to command test acquisition of test data by means of the testing sensor.

The programming device may be configured to create an instruction for an operation of the testing robot based on the parameter input. Once an instruction has been created, the testing robot may be automatically commanded to move to a second test object and display image data of the second test object for tuning parameters associated with non-destructive testing of the second test object. Once the operator has adjusted parameters associated with non-destructive testing of the second test object (or accepted the parameters), the testing robot may be automatically commanded to move to a third test object and so on.

The programming device may be configured to display a visual overlay on the image data displayed on the display, the visual overlay being indicative of a non-destructive testing setting associated with the test object on the display. The visual overlay may for example indicate dimensions of the testing sensor in relation to the test object and/or in relation to the workpiece. In this case, the visual overlay may be presented as a virtual shadow.

The image data on the display may be displayed in real time. With real time is meant a delay of less than 30 ms, such as 12 ms or less.

The programming device may be a teach pendant unit. Alternatively, the programming device may be a portable computer or a stationary computer.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
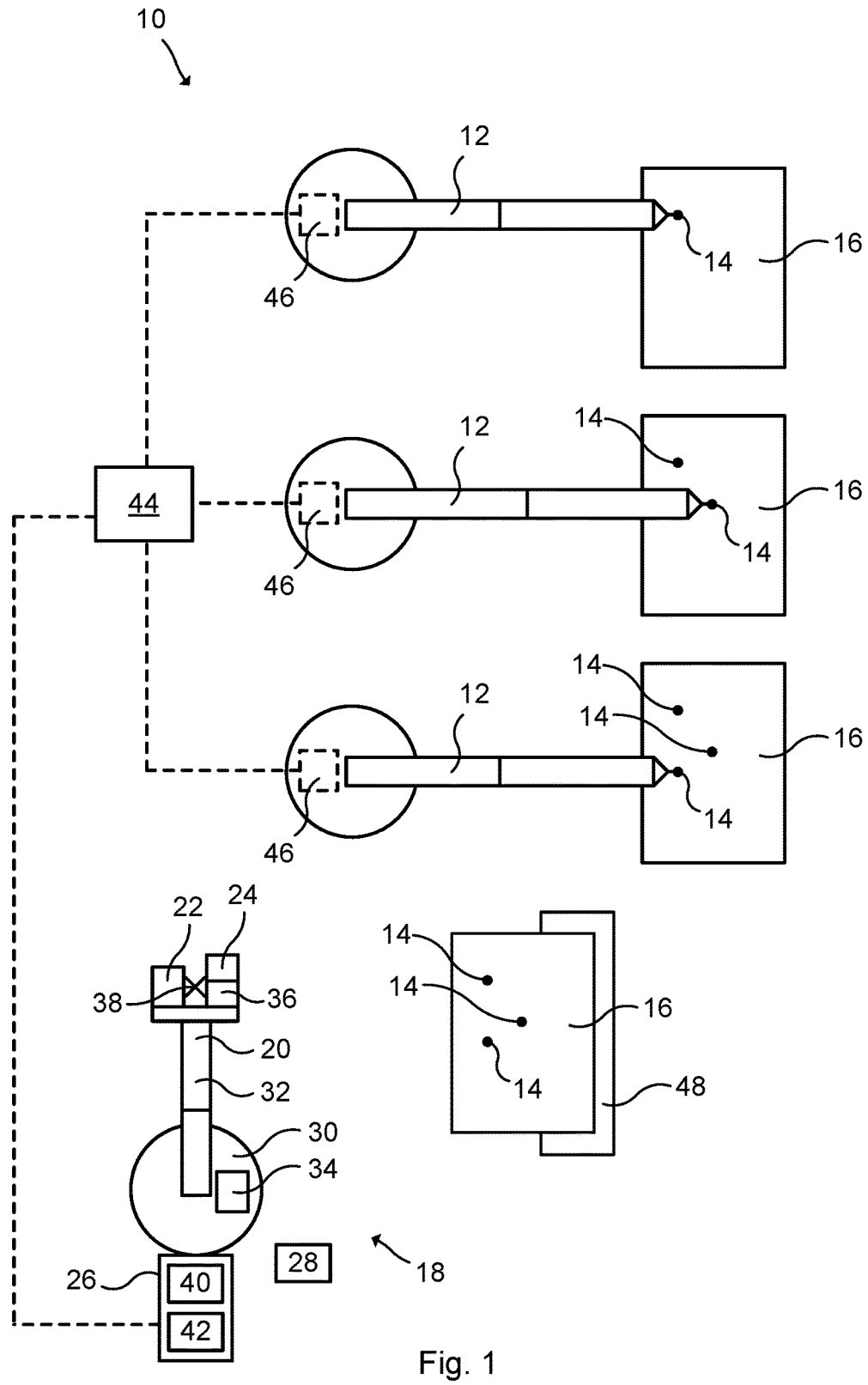
FIG. 1: schematically represents a robot system.

In the following, a method for detecting a position anomaly of a test object on a workpiece, a control system for detecting a position anomaly of a test object on a workpiece, a testing system comprising a control system, a robot system comprising a testing system, a testing robot comprising a calibration arrangement and a programming device for programming operations of a testing robot, will be described. The same or similar reference numerals will be used to denote the same or similar structural features.

FIG. 1 schematically represents a robot system 10. The robot system 10 in FIG. 1 is arranged in a production line and comprises three welding robots 12. Each welding robot 12 is configured to weld spot welds 14 on workpieces. In FIG. 1, the workpieces are exemplified as vehicle bodies 16.

The robot system 10 further comprises a testing system 18. The testing system 18 is configured to inspect the spot welds 14 in a non-destructive manner. In the present example, the spot welds 14 thereby constitute test objects for the testing system 18 to inspect.

The testing system 18 comprises a testing robot 20, an image sensor 22, a testing sensor 24 and a control system 26. The testing system 18 of this example further comprises a programming device 28 for programming operations of the testing robot 20.

The testing robot 20 carries the testing sensor 24. In this example, the testing robot 20 also carries the image sensor 22. The image sensor 22 is configured to capture images of the spot welds 14. In the context of this disclosure "capturing an image" shall be construed broadly to cover any suitable means of obtaining image data comprising information for generating an image.

The testing robot 20 further comprises a body 30 and an arm 32 movable relative to the body 30. The body 30 may be either stationary or movable. The body 30 may for example be a stationary base or a movable link of the testing robot 20. The testing robot 20 further comprises a calibration arrangement 34. The calibration arrangement 34 is fixed to the body 30. The calibration arrangement 34 is used for a reference acquisition of image data by the image sensor 22 and for a reference acquisition of test data by means of the testing sensor 24. The testing robot 20 also comprises a damper 36 and a tool center point 38. The damper 36 is provided between the arm 32 and the testing sensor 24.

The control system 26 comprises a data processing device 40 and a memory 42 having a computer program stored thereon. The computer program comprises program code which, when executed by the data processing device 40, causes the data processing device 40 to perform, or command performance or, various steps as described herein.

To be able to capture an image of a certain spot weld 14, the testing system 18 may utilize an approximate position of the certain spot weld 14 in relation to the testing robot 20. To this end, a central controller 44 communicates the theoretical position of each spot weld 14 in relation to the vehicle body 16 to the control system 26, the theoretical positions being known from welding programs running in respective welding robot controllers 46 of the welding robots 12.

The control system 26 calculates, on the basis of the theoretical positions in relation to the vehicle body 16, the theoretical position of each spot weld 14 in relation to the testing robot 20. To this end, the vehicle body's 16 position and orientation in relation to the testing robot 20 needs to be known. This can be achieved e.g., by fastening the vehicle body 16 in a fixture 48 with a well-defined position and orientation in relation to the testing robot 20. Alternatively, the vehicle body's 16 position and orientation may be determined with the help of image data of the vehicle body 16 i.e., by detecting well-defined features of the vehicle body 16 to calculate a transformation between the vehicle body's 16 coordinate system and the testing robot's 20 coordinate system in a manner known to a person skilled in the art.

However, knowing the vehicle body's 16 position and orientation in relation to the testing robot 20 may not be necessary as long as approximate positions and orientations of the spot welds 14 in relation to the testing robot 20 are known. For example, the central controller 44 may communicate the theoretical positions and orientations of the spot welds 14 in relation to the fixture 48 to the control system 26. By bringing the fixture 48 in a well-defined position and orientation in relation to the testing robot 20, also the theoretical positions and orientations of the spot welds 14 in relation to the testing robot 20 become known to the testing robot 20 without any information on the overall position or orientation of the vehicle body 16.

The theoretical positions do not necessarily match with the real positions of the spot welds 14. There may be several reasons for this mismatch. For example, there may be an error between the position of the vehicle body 16 and the position of one or more of the welding robots 12 during the welding process, or the welding electrodes of one or more welding robots 12 may be worn out, or the individual parts of the vehicle body 16 may have inaccurate dimensions. The mismatch is typically in the order of 0-3 millimeters, which does not affect the image sensor's 22 ability to capture images of specific spot welds 14. As the approximate positions and orientations of the spot welds 14 in relation to the testing robot 20 are known, and as the testing robot 20 thereby can be moved to direct the image sensor 22 towards certain individual spot welds 14 or certain groups of spot welds 14, the image sensor 22 will be in the position to capture an image of the spot weld 14 to obtain image data for processing by the control system 26 to determine a real position of the spot weld 14 in relation to the testing robot 20. The real position may be determined by means of a convolutional neural network (CNN).

The real position may then be compared with a reference position. Based on the comparison, a position anomaly of the spot weld 14 can be detected. When the real position of the spot weld 14 in relation to the testing robot 20 has been determined, the testing sensor 24 is moved into contact with the spot weld 14 by the testing robot 20 to obtain a test measurement.

Figure 2:
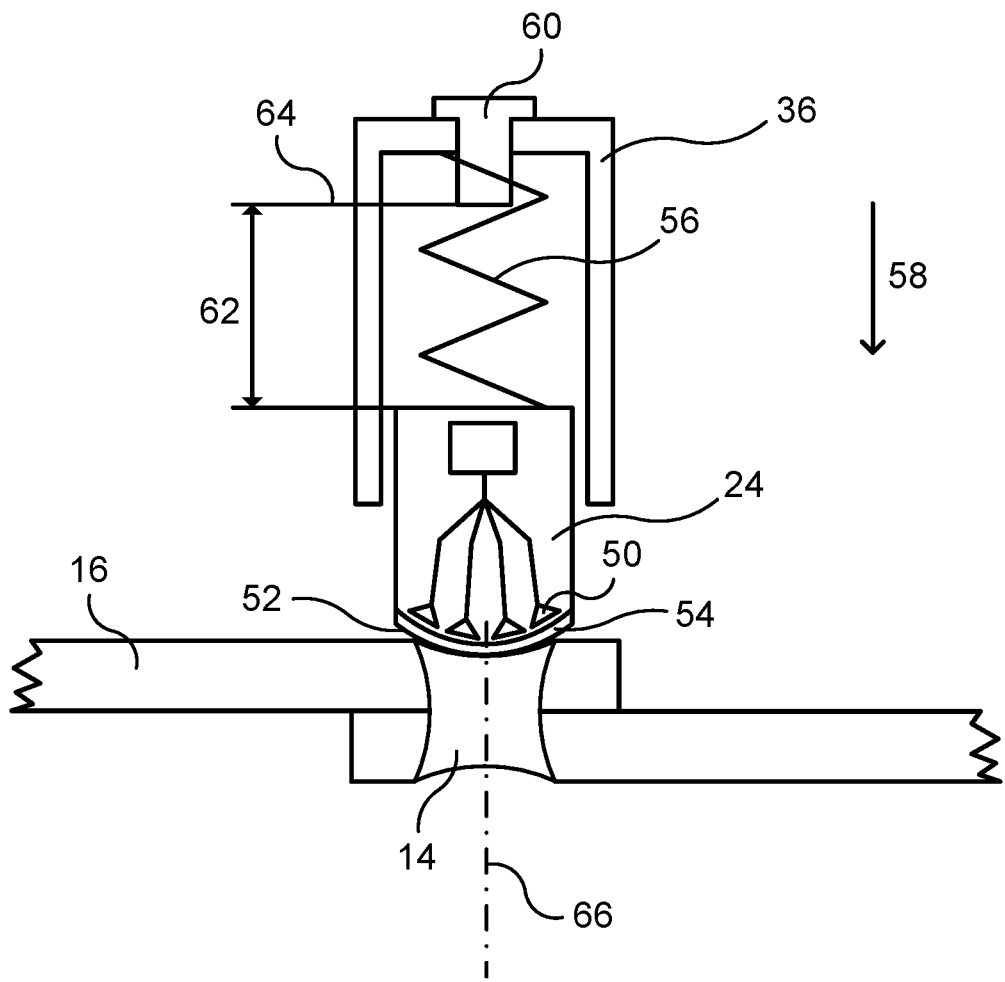
FIG. 2: schematically represents a testing sensor in contact with a spot weld.

FIG. 2 schematically represents the testing sensor 24 when brought into contact with the spot weld 14. The testing sensor 24 of this example comprises a phased array ultrasonic scanner comprising an array of ultrasonic transducers 50, a membrane 52 at an end of the testing sensor 24 (lower end in FIG. 2), and a coupling medium 54. The coupling medium 54 is accommodated inside the membrane 52 between the ultrasonic transducers 50 and the membrane 52. The coupling medium 54 may for example be water. FIG. 2 further shows a central axis 66 of the testing sensor 24.

In order to obtain a valid test measurement, the testing sensor 24 should preferably be pushed against the spot weld 14 with the same constant force. To this end, the damper 36 between the arm 32 and the testing sensor 24 is used. The main function of the damper 36 is to regulate the force with which the testing sensor 24 is pushed against the vehicle body 16 and the spot weld 14. The testing sensor 24 should preferably exert the same constant force on each spot weld 14 irrespective of the orientation of the testing sensor 24 in relation to the respective spot weld 14.

The damper 36 of this example comprises a spring 56 pushing the testing sensor 24 in a linear direction 58 in relation to the damper 36, and a distance measurement device 60 measuring a distance 62 between the testing sensor 24 and a reference point 64 within the damper 36. As an alternative to the spring 56, a pneumatic cylinder may be used. When the testing sensor 24 comes into contact with the spot weld 14, the spring 56 starts to be compressed and the distance 62 between the testing sensor 24 and the reference point 64 starts to decrease, which is detected by the distance measurement device 60. When the testing sensor 24 has been pushed for example 1 mm relative to the damper 36, the distance measurement device 60 issues a trigger signal and the testing robot 20 stops. The distance 62 and thereby the force exerted by the testing sensor 24 on the spot weld 14 can be kept constant from one test measurement to another on the basis of the reading of the distance measurement device 60.

The distance the testing robot 20 had to travel to receive the trigger signal may be used as a value indicative of the test object position. This distance may be referred to as a trigger distance. The trigger distance provides "depth information" regarding the position of the spot weld 14. The trigger distance may for example be a distance from a pre-defined starting point in proximity to the spot weld 14. The starting point may for example be determined based on the theoretical position or the real position of the spot weld 14. Advantageously, the trigger distance does not have to be defined as an absolute value. Rather, a plurality of trigger distances for corresponding spot welds 14 of different vehicle bodies 16 may be stored and compared. If one trigger distance deviates from for example a mean trigger distance, it can be concluded that there is a position anomaly of the spot weld 14. If the trigger distance is shorter than the mean trigger distance, the spot weld 14 is positioned too high (in FIG. 2) and vice versa. A deviating position of the spot weld 14 may for example indicate that the vehicle body 16, or a part thereof, has been mounted incorrectly. Although the positioning accuracy of the testing robot 20 may not be as high as for a CMM (coordinate-measurement machine), the positioning accuracy of the testing robot 20 is sufficient for detecting position anomalies of the spot weld 14. This means that an expensive and time-consuming operation of a CMM can be avoided.

Once the testing sensor 24 exerts a pre-defined contact force on the spot weld 14, as determined by the distance measurement device 60, test data of the spot weld 14 is acquired by the testing sensor 24. Based on the test data, a shape of the spot weld 14 is determined. A geometrical center of this shape may be used as a test object position for comparison with a reference position to detect a position anomaly of the spot weld 14. When the testing sensor 24 exerts the pre-defined contact force on the spot weld 14, also a position of the tool center point 38 may be stored and compared with a reference position to detect a position anomaly of the spot weld 14.

Figure 3:
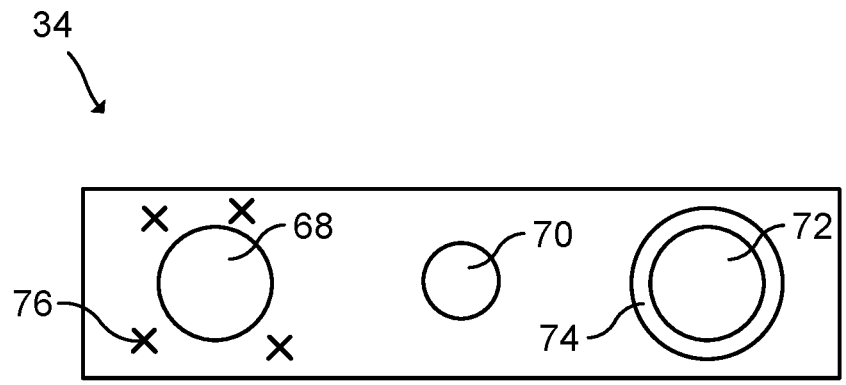
FIG. 3: schematically represents a calibration arrangement.

FIG. 3 schematically represents a top view of the calibration arrangement 34. The calibration arrangement 34 of this example comprises three reference objects, here exemplified as three reference spot welds 68, 70 and 72. Each of the first reference spot weld 68 and the third reference spot weld 72 is an approved spot weld meeting a quality target. The second reference spot weld 70 is a deliberately defect reference spot weld not meeting the same quality target.

The calibration arrangement 34 further comprises a blocking structure, here exemplified as a ring 74. The ring 74 surrounds the third reference spot weld 72.

The calibration arrangement 34 further comprises a plurality of reference features 76. The reference features 76 are detectable by image processing of an image captured by the image sensor 22.

In the following, a method of checking functionality of the image sensor 22 and the testing sensor 24 will be described. The checking may be performed automatically and/or on demand.

The testing robot 20 moves the testing sensor 24 into contact with each reference spot weld 68, 70 and 72, one at a time. The testing robot 20 knows the position of the reference spot welds 68, 70 and 72 since the calibration arrangement 34 is fixed to the body 30.

The first reference spot weld 68 is supposed to be ok, i.e. to meet a given quality target. By acquiring test data of the first reference spot weld 68 by means of the testing sensor 24, it can be seen if the testing system 18 manages to correctly classify the first reference spot weld 68 as meeting the quality target. If not, the testing robot 20 is not functioning as intended.

Furthermore, by displacing the testing sensor 24 and acquiring second test data of the first reference spot weld 68, it can be investigated whether the test data changes as expected. For example, a rotation of the testing sensor 24 about the axis 66 should lead to a corresponding rotation of the first reference spot weld 68 in the test data. As a further example, a translational movement of the testing sensor 24 transverse to the axis 66 should lead to a corresponding translational movement of the first reference spot weld 68 in the test data. In this way, the testing sensor 24 can be calibrated.

Furthermore, since the exact position of the first reference spot weld 68 is known (in three dimensions), the first reference spot weld 68 may be used to calibrate the trigger distance for the issuance of the trigger signal by the distance measurement device 60. This trigger distance, as determined by a test measurement on the first reference spot weld 68, may be used as a reference position in the method for detecting position anomalies of the spot welds 14.

Furthermore, the positions of the reference features 76 on the calibration arrangement 34 are known. The reference features 76 are easily detectable by the image sensor 22. The image sensor 22 captures an image of the reference features 76. In the image, the reference features 76 should be positioned correctly. Otherwise, it can be concluded that the image sensor 22 is positioned incorrectly. Furthermore, by calculating how sharp the image of the reference features 76 is, dirt on a lens of the image sensor 22 and if the lens if out of focus can be detected. The sharpness of the image can be calculated by using the variance of the Laplacian. By displacing the image sensor 22 and acquiring second image data of the reference features 76, it can be investigated whether the image data changes as expected. For example, a rotation of the image sensor 22 about a principal axis of the lens should lead to a corresponding rotation of the reference features 76 in the image data. As a further example, a translational movement of the image sensor 22 transverse to the principal axis should lead to a corresponding translational movement of the reference features 76 in the image data. In this way, the image sensor 22 can be calibrated.

The second reference spot weld 70 is supposed to be not ok, i.e. to not meet the quality target. In this example, the second reference spot weld 70 is too small. By acquiring test data of the second reference spot weld 70 by means of the testing sensor 24, it can be seen if the testing system 18 manages to correctly classify the second reference spot weld 70 as not meeting the quality target. If not, the testing robot 20 is not functioning as intended.

Figure 4:
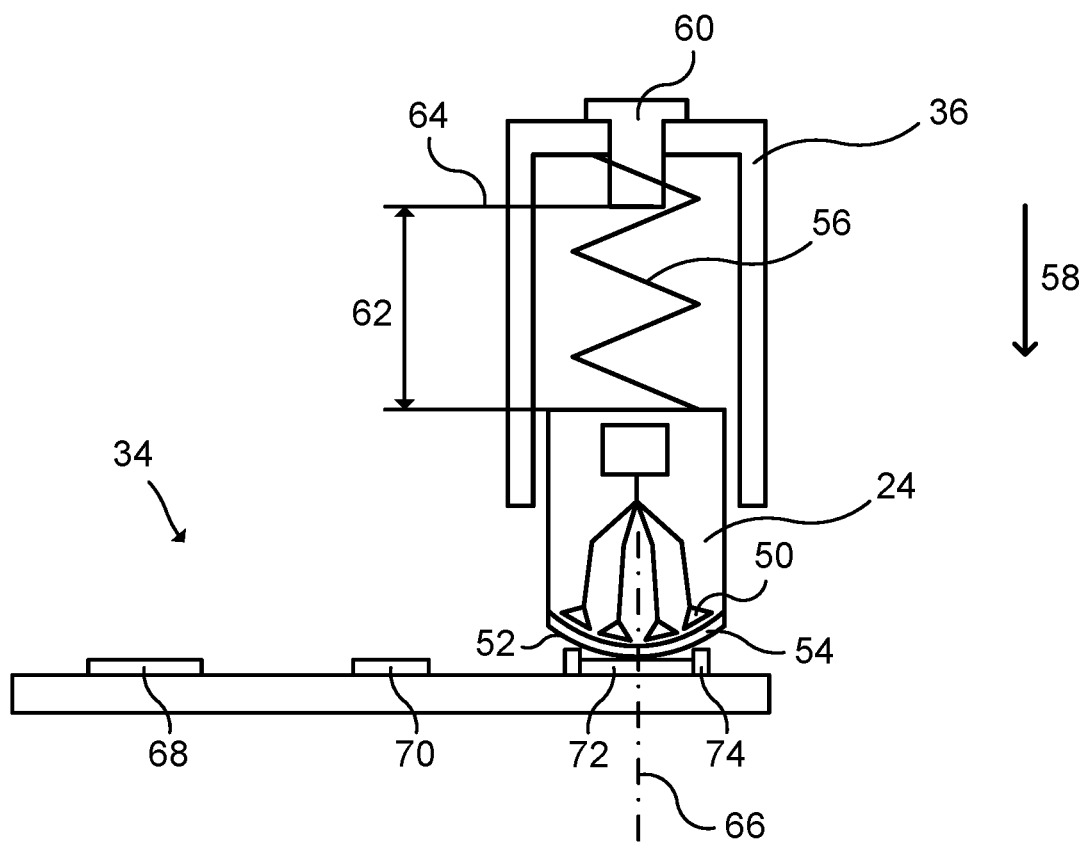
FIG. 4: schematically represents the testing sensor and the calibration arrangement.

FIG. 4 schematically represents a side view of the testing sensor 24 and the calibration arrangement 34. In order for the testing sensor 24 of this example to function properly, the membrane 52 should be convex. However, if the coupling medium 54 has evaporated or if the membrane 52 is pierced, the membrane 52 may not be convex and the testing sensor 24 may not function properly. The ring 74 may for example protrude 1-2 mm above the third reference spot weld 72.

The testing robot 20 moves the testing sensor 24 to the third reference spot weld 72 for acquisition of test data. If the membrane 52 is convex enough, the membrane 52 should be brought sufficiently into contact with the third reference spot weld 72. The ring 74 is thus configured such that the membrane 52 can be brought into contact with the third reference spot weld 72 only if the membrane 52 is convex enough, and such that if the membrane 52 is not enough convex, the membrane 52 cannot be brought sufficiently into contact with the third reference spot weld 72 for a valid test measurement by means of the testing sensor 24.

If the testing system 18 correctly classifies the first reference spot weld 68 to meet the quality target, but incorrectly classifies the third reference spot weld 72 to not meet the quality target, it can be concluded that there is an issue with the membrane 52, e.g. that the membrane 52 is not properly inflated. This in turn may indicate that a supply of coupling medium 54 is not functioning properly, or that there is no coupling medium 54 left.

Figure 5:
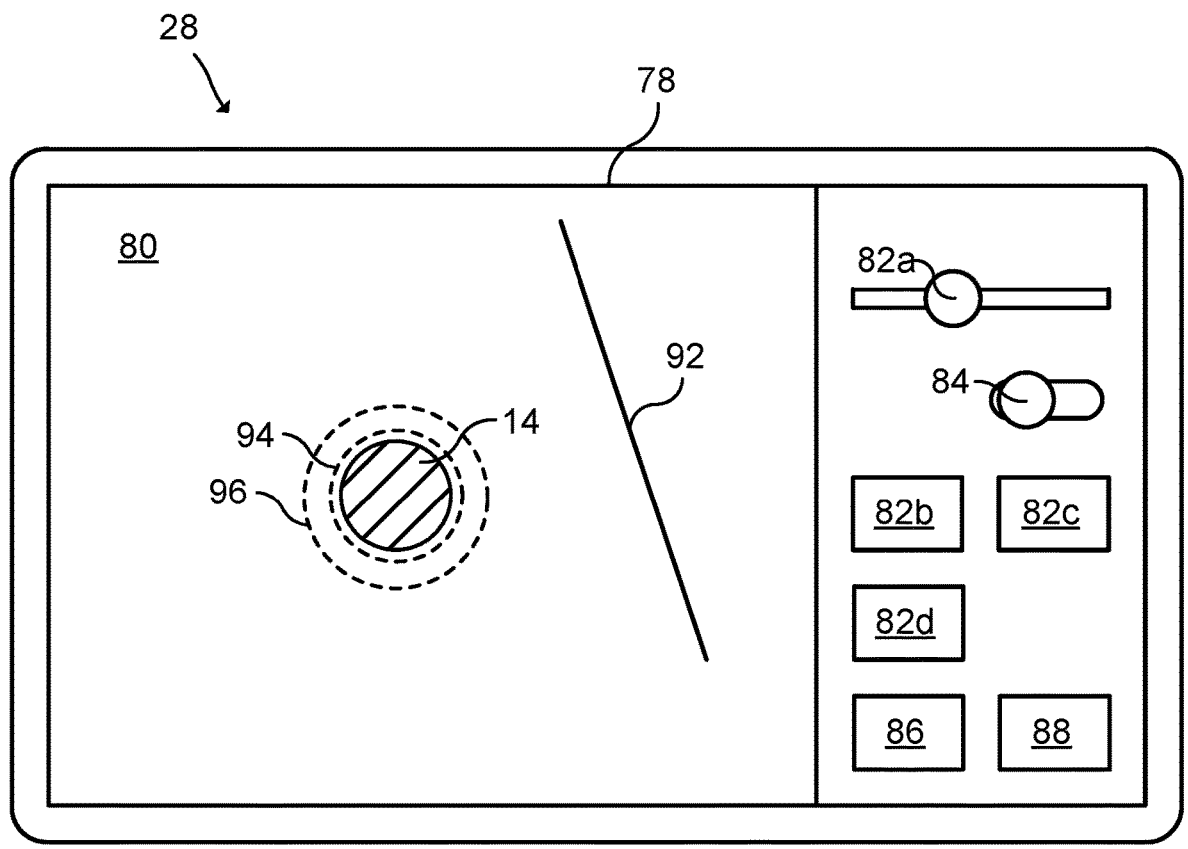
FIG. 5: schematically represents a programming device.

FIG. 5 schematically represents one example of the programming device 28. The programming device 28 of this example comprises a touch screen 78. A display 80 presents an image of the spot weld 14 captured by the image sensor 22. The programming device 28 further comprises various parameter inputs 82a, 82b, 82c, 82d, 84, 86 and 88. In this example, the parameter inputs 82a, 82b, 82c, 82d, 84, 86 and 88 are provided as software sliders/buttons on the touch screen 78. However, a wide range of alternative implementations are possible.

The testing robot 20 may be commanded to run in a setup mode. In the setup mode, the testing robot 20 may halt at an instruction near each spot weld 14. The testing robot 20 may for example halt at the pre-defined starting point in proximity to each spot weld 14 (see above in connection with the trigger distance). When the testing robot 20 has halted, the image sensor 22 captures an image of the spot weld 14 and presents the image on the display 80. Now, the operator may give a manual image input in relation to the spot weld 14 as displayed on the display 80.

The operator may for example define a boundary 92 for the specific spot weld 14 currently imaged on the display 80 by touching the display 80 and drawing a line or other shape. The testing robot 20 may be prevented from crossing the boundary 92. The boundary 92 may for example be set to avoid collision with a wall or with the fixture 48. The boundary 92 is one example of manual image input in relation to the spot weld 14.

As a further example, the operator may adjust a spot weld definition 94 for the specific spot weld 14 currently imaged on the display 80. In FIG. 5, a spot weld definition 94 is shown as a dashed circle. The spot weld definition 94 may define a size and a position of the spot weld 14. Also, the spot weld definition 94 may be adjusted by the operator by touching the display 80. The spot weld definition 94 is a further example of a manual image input in relation to the spot weld 14.

In FIG. 5 a watermark 96 is also displayed on the display 80. The watermark 96 indicates the geometry of the testing sensor 24 in relation to the image of the spot weld 14. The operator can thereby see the size of the area on the vehicle body 16 that is occupied by the testing sensor 24 during non-destructive testing. The watermark 96 is one of many examples of a visual overlay.

The operator may further adjust exposure time of the image sensor 22. In this example, the parameter input 82a is an exposure slider for adjusting the exposure time. Adjustment of the exposure time by means of the exposure slider 82a is one example of a parameter input defining a parameter of the image sensor 22.

The operator may further adjust an ultrasonic gain of the testing sensor 24. In this example, the parameter input 82b is an ultrasonic gain button for adjusting the ultrasonic gain. Pressing of the ultrasonic gain button 82b may for example open a window where a value of the ultrasonic gain can be entered. Adjustment of the ultrasonic gain by means of the ultrasonic gain button 82b is one example of a parameter input defining a parameter of the testing sensor 24.

The operator may further adjust a grinding parameter of a grinder of the testing robot 20, such as a grinding time. In this example, the parameter input 82c is a grinding button for adjusting the grinding time. Pressing of the grinding button 82c may for example open a window where a value of the grinding time can be entered. Adjustment of the grinding time of a grinder of the testing robot 20 is one example of a parameter input defining a parameter of the testing robot 20.

In this example, the parameter input 82d is a measurement angle button. The operator may further adjust a measurement angle of the testing sensor 24 by means of the measurement angle button 82d. The measurement angle may for example be an angle relative to a normal from the spot weld 14, or an angle relative to a normal from a surface on the vehicle body 16 immediately adjacent to the spot weld 14. The measurement angle may need to be very accurately set for some spot welds 14. Pressing of the measurement angle button 82d may for example open a window where a value of the measurement angle can be entered. Adjustment of the measurement angle by means of the measurement angle button 82d is a further example of a parameter input defining a parameter of the testing sensor 24.

For some spot welds 14, a single degree erroneous measurement angle may deteriorate the non-destructive testing. The programming device 28 enables accurate setting of the measurement angle. If the measurement angle deviates from a normal to the vehicle body 16, it may then be assumed that corresponding spot welds 14 on different vehicle bodies 16 have the same measurement angle deviations.

The operator may further activate automatic adjustment of one or more parameters associated with non-destructive testing of the specific spot weld 14 currently presented on the display 80. To this end, the input 84 of this example is an automatic adjustment switch 84. When the automatic adjustment is activated, the programming device 28 automatically generates parameter inputs that are considered optimal for the testing of the specific spot weld 14. Also, a boundary 92 and/or a spot weld definition 94 may be generated in this way.

The operator may accept these automatically generated parameters, or may adjust these further. Once one or more parameters associated with the testing of the specific spot weld 14 currently presented on the display 80 have been defined (manually and/or automatically), the operator may either perform a test execution of the non-destructive testing using these parameters, or command programming of the robot program using these parameters. To these ends, the input 86 of this example is a test execution button and the input 88 of this example is a programming button.

By pressing the test execution button 86, a test measurement is performed by the testing sensor 24 on the spot weld 14 currently displayed on the display 80. The test data from the test measurement is then displayed on the display 80. If the test data is satisfactory, the operator may add the parameters used for the test measurement to the robot program (by means of the programming button 88). If the test data is not satisfactory, the operator may adjust one or more parameters again. Testing of the exposure time in the "real world" in this way has been found very advantageous in comparison to programming of exposure times in simulated environments. Testing of the ultrasonic gain in the "real world" in this way has also been found very advantageous since acoustic conditions are often difficult to accurately simulate.

The programming device 28 can also be used in ways other than in a setup mode. For example, after a robot program has started to run in production, the programming device 28 can be used to modify parameters associated with a particular spot weld 14. The operator may for example initiate a command "go to weld spot number 45" by means of the programming device 28. Then, various parameters associated with this particular spot weld 14 can be adjusted as described above.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method for detecting a position anomaly of a test object on a workpiece, the method comprising:
capturing an image of the test object to obtain image data;
determining a real position of the test object in relation to the testing robot based on the image data;
moving a testing sensor carried by the testing robot into contact with the test object based on the real position;
acquiring test data of the test object by means of the testing sensor when the testing sensor is in contact with the test object; and
detecting a position anomaly of the test object based on a comparison between a test object position and a reference position, the test object position being based on the real position, based on the test data and/or based on a position of the testing robot when the testing sensor is in contact with the test object.

2. The method according to claim 1, wherein the reference position is a mean test object position determined based on a plurality of test object positions for corresponding test objects on different workpieces.

3. The method according to claim 1, wherein the reference position is a nominal position.

4. The method according to claim 1, further comprising determining that there is a position anomaly of the test object if a deviation of the test object position from the reference position exceeds a threshold value.

5. The method according to claim 1, further comprising determining that there is a position anomaly of the test object by means of machine learning.

6. The method according to claim 1, wherein the testing robot comprises a damper movable in response to a contact force between the testing sensor and the test object, and wherein the test object position is based on a position of the damper when the testing sensor exerts a pre-defined contact force on the test object.

7. The method according to claim 1, wherein the test object position is based on a position of a tool center point of the testing robot when the testing sensor is in contact with the test object.

8. The method according to claim 1, wherein the image data is captured by means of an image sensor carried by the testing robot.

9. A control system for detecting a position anomaly of a test object on a workpiece, the control system comprising at least one data processing device and at least one memory having a computer program stored thereon, the computer program including program code which, when executed by one or more of the at least one data processing device, causes one or more of the at least one data processing device to perform the steps of:

commanding capture of an image of the test object to obtain image data;

determining a real position of the test object in relation to the testing robot based on the image data;

commanding the testing robot to move a testing sensor, carried by the testing robot, into contact with the test object based on the real position;

commanding the testing sensor to acquire test data of the test object when the testing sensor is in contact with the test object; and detecting a position anomaly of the test object based on a comparison between a test object position and a reference position, the test object position being based on the real position, based on the test data and/or based on a position of the testing robot when the testing sensor is in contact with the test object.

10. A testing system comprising a testing robot, an image sensor, a testing sensor carried by the testing robot and a control system according to claim 9.

11. The testing system according to claim 10, wherein the testing robot comprises a damper movable in response to a contact force between the testing sensor and the test object, and wherein the computer program including program code which, when executed by one or more of the at least one data processing device, causes one or more of the at least one data processing device to determine the test object position based on a position of the damper when the testing sensor exerts a pre-defined contact force on the test object.

12. The testing system according to claim 10, wherein the image sensor is carried by the testing robot.

13. A robot system comprising a plurality of welding robots and a testing system according to claim 11.

* * * * *